United States Patent [19]

Bunge

[11] 4,090,792
[45] May 23, 1978

[54] SINGLE BEAM PHOTOMETER FOR INVESTIGATING A SPECIMEN

[75] Inventor: Konrad Bunge, Cologne, Germany

[73] Assignee: Bayer Aktiengesellschaft, Leverkusen, Germany

[21] Appl. No.: 698,559

[22] Filed: Jun. 22, 1976

[30] Foreign Application Priority Data

Jul. 9, 1975 Germany .................. 2530480

[51] Int. Cl.² .................. G01J 3/50; G01N 21/24
[52] U.S. Cl. .................. 356/188; 356/189; 356/201
[58] Field of Search .................. 356/51, 188, 189, 201; 250/343; 350/166

[56] References Cited

U.S. PATENT DOCUMENTS 3,744,918   7/1973   Jacobsson .................. 356/188
3,994,592  11/1976   Lardon et al. .............. 356/189 X Primary Examiner—F. L. Evans
Attorney, Agent, or Firm—Burgess, Dinklage & Sprung

[57] ABSTRACT

In a single beam photometer the transmitted radiation is modulated in respect of wavelength. As the modulator, an interference pattern filter is used, whose transmitted wavelength agrees in the middle approximately with the absorption band to be measured. The interference pattern filter is either arranged so as to be rotatable in the beam path or oscillates at right angles to the optical axis. The electronic system is tuned to the first harmonic of the interference pattern filter frequency; i.e. the effects of signals of other frequencies are suppressed by the electronics.

11 Claims, 14 Drawing Figures

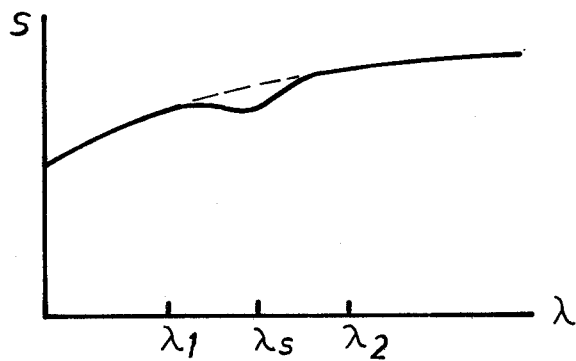
FIG. 1
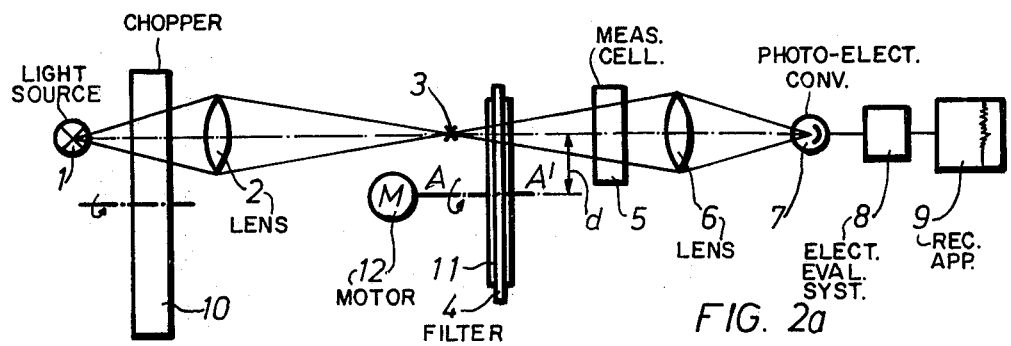
FIG. 2a
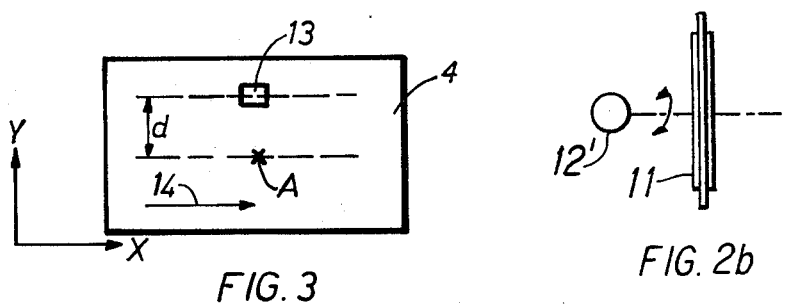
FIG. 3
FIG. 2b

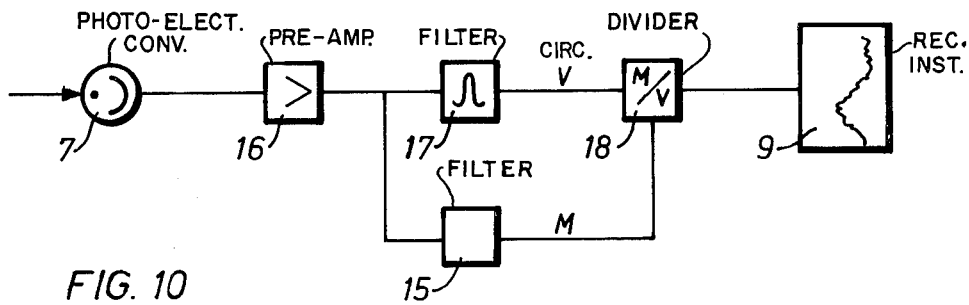
FIG. 10
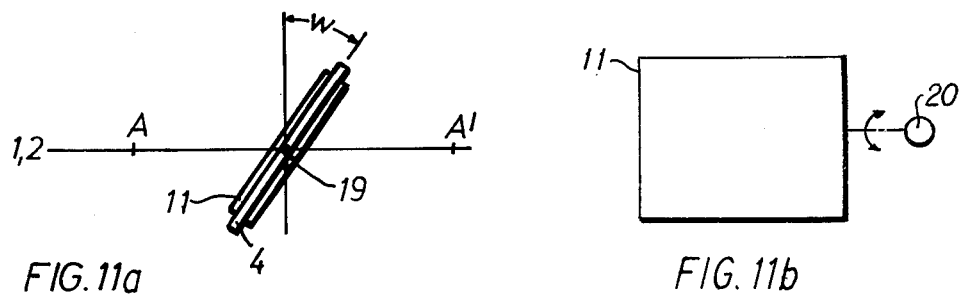
FIG. 11a
FIG. 11b
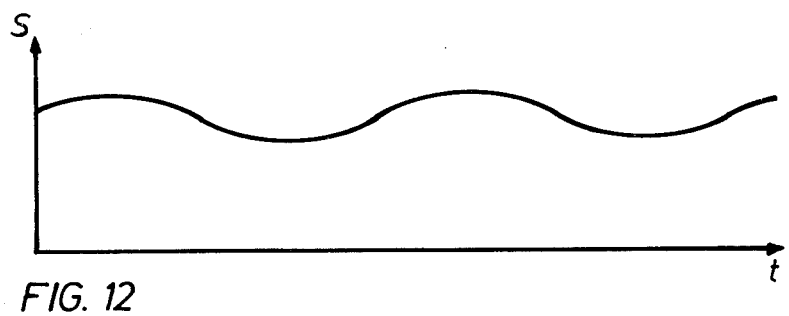
FIG. 12

SINGLE BEAM PHOTOMETER FOR INVESTIGATING A SPECIMEN

The invention relates to a single beam photometer with a monochromator and to a method of operating such a photometer.

The photometer is used for determining the concentration of a substance from its selective absorption in a specific part of the optical spectrum. For this determination, this spectral range is periodically scanned. From the signal formed during scanning, a value is obtained by a special evaluation method which is characteristic for the concentration of the substance being investigated.

Photometers of this type of construction are particularly suitable for determining the concentration of substances which have only low selective absorption. They also prove useful in cases in which the low absorption of the substance being examined has superimposed thereon non-selective absorptions of other substances occurring in the measurement material. A substantial advantage of this type of photometer is its simple construction, which favours use in the factory, e.g. on the process stream.

Measurement of concentration by the determination of the optical absorption or transparency is known in measurement technology. The basic mode of operation becomes clear if one imagines the scanning process in measurement with a recording single beam photometer. The result of such a scanning of the spectral range near the selective absorption of the substance under examination is shown in FIG. 1. The electrical signal produced by the photoelectric converter of the photometer is plotted against the wave length. At the wave length $\lambda s$, at which the selective absorption might occur, in the otherwise "smooth" curve there is a "bulge". The concentration is determined by forming a recording curve, as would result without the presence of the substance under examination, and this curve is compared with the actual curve. Numerous proposals for evaluations on this principle have been made. They work with hand operations, such as application of straight edges, special automatic evaluation systems or with data processing machines.

All hitherto known arrangements do however have one thing in common, that they have not led to simple, robust photometer constructions, which could have been used generally in practice.

The object of the invention is, while retaining the above stated known single beam photometer principle with scanning of a spectral range, in which the substance under examination is selectively absorbed, to develop a simple, robust type of photometer, as is required in chemical works, for functions related to environmental protection etc.

This object is achieved according to the invention with a single beam photometer working according to the above described principle, as follows:

(a) The monochromator is designed as an interference pattern filter, whose filtered wavelength agrees in the middle approximately with the absorption band to be measured.

(b) The interference pattern filter is arranged so as to be movable in the light path and executes a periodic movement with the frequency $n$, with the light path forming a closely limited beam at the position of the interference pattern filter.

(c) The measurement frequency of the electronic evaluation system is tuned to harmonics of the frequency $n$.

"Closely limited" means that the resolution of the photometer is in practice conditioned only by the resolution of the interference pattern filter and not by the size of the light patch on the interference pattern filter. In practice beam diameters of from 1 to 4 mm were used.

According to one embodiment of the invention, the interference pattern filter executes an oscillating movement i.e. the interference pattern filter oscillates at right angles to the optical axis and in the direction of its change of wavelength.

A more elegant solution provides for the interference pattern filter to be rotatable about an axis, which is oriented parallel to the optical axis and is displaced relative to the optical axis by the distance $d$. Advantageously the distance $d$ can be adjusted by displacing the interference pattern filter. In practice the distance $d$ is from a few millimeters to a few centimeters. The frequency of rotation $n$ of the filter is of the order of a few tens Hz. The light having passed through the filter passes within one period of the basic frequency twice in inverted sequence through a specific spectral range. The width of the spectral range passed through is given by the distance between the optical axis and the rotation axis. By altering $d$, the width of the spectral range passed through can be varied. The interference pattern filter is selected with regard to its wavelength range and arranged in the beam path in such a way that the selective absorption of the substance under examination lies in the middle of the spectral range passed through. Thus the absorption point is passed through twice within one period of the basic frequency. As a result of the absorption of the substance under examination there results a harmonic content at the first harmonic of the basic frequency. The first harmonic i.e. the frequency $2n$ is advantageously selected as the measurement frequency of the photometer. This harmonic content is thus a measurement for the concentration under examination, once the photometer has been calibrated.

According to a refinement of the invention, the interference pattern filter can be pivoted about an axis which is perpendicular to the optical axis and the axis of rotation and which passes through the points of intersection of these two axes with the interference pattern filter. In practice pivotal movement of up to + or − 10% was permitted. In this pivoting the mean wave length (central wave length) of the radiation transmitted by the interference pattern filter changes. Thus the pivoting permits a fine adjustment of the central wave length. This adjustment can be carried out with the photometer during operation.

According to a further improvement of the invention, the previously mentioned pivoting takes place periodically, i.e. the interference pattern filter in addition to its oscillating or rotating movement executes a pivoting movement at right angles to the optical axis and to the axis of rotation. The frequency 1 of the pivoting movement is small in relation to the frequency $n$ of rotation or oscillation. In practice frequencies of from 1 to $10^{-2}$ Hz were used.

The periodic pivoting leads to periodic changes of the measurement value with the period of pivoting. The maximum value indicated by the photometer occurring in each period is even more suitable as a measurement value for the concentration under examination than the above mentioned harmonic content $2n$. Each maximum value is dependent to only a small extent on undesired changes in the characteristics of the photometer and also partially of the measurement material. Changes in the photometer can occur for example because of misadjustments (for example after changing the light source), through the effects of temperature on the interference pattern filter, etc. Changes in the measurement material (e.g. temperature rise) can slightly shift the position of the absorption band of the substance under examination.

The following list shows the numerous advantages of the photometer according to the invention.

1. The simple measurement principle permits a simple compact construction of the entire unit. Owing to the possibility of changing the analysis wavelength simply by displacing the filter in the direction of the wavelength change, it is possible to harmonise different units for the same measurement task. For these reasons the unit is particularly suitable for the continuous analysis of process streams.

2. To obtain the measurement an entire spectral range is scanned. This has the advantage relative to a measurement with discrete wavelengths that the result does not greatly depend on particularities in the spectrum in the case of particular wavelengths. Moreover the processing of the signal, in which no discontinuities occur, is simple.

3. The wavelength interval to be worked with can be easily adjusted. It is necessary only to alter the distance between the optical axis and the axis of rotation of the filter.

4. A signal is produced by the converter, which is proportional to the concentration of the substance under examination, with the zero signal corresponding to a zero concentration. With many photometers the measurement value is the ratio of two almost identical signals. In such cases it is difficult or impossible to measure substances with low absorptions.

5. Disruptive absorptions have only a small effect, because they influence principally the intensity of the basic frequency, but not the measurement frequency. For the same reason changes in spectral sensitivity of light source and receiver, temperature effects in the filter, etc., also have little disruptive effect.

6. In the embodiment with additional periodic pivoting of the interference pattern filter, effects which slightly displace the measurement wave length, only slightly affect the measurement result.

The invention is illustrated in more detail in the following with reference to specific embodiments and drawings.

FIG. 1 shows the recording of the spectrum of the measurement material around the absorption point of the substance to be examined.

FIG. 2a shows the beam path of the photometer.

FIG. 2b shows the filter mounting of FIG. 2a mounted for oscillation.

FIG. 3 shows a plan view of the rotating interference pattern filter.

FIG. 10 shows the electrical processing of the signal using a chopper.

FIG. 11 shows an improved embodiment of the invention with an additional periodic pivoting of the interference pattern filter.

FIG. 12 shows the modulation of the recording value with the frequency of the additional periodic pivoting movement.

Figure 4:
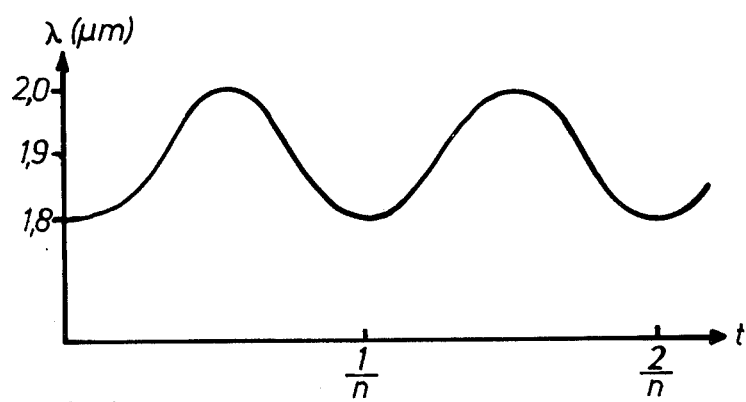
FIG. 4 shows the wavelength measured behind the interference pattern filter as a function of time.

FIG. 1 has already been substantially discussed. According to the periodic movement of the interference pattern filter, the area from λ 1 to λ 2 is periodically scanned.

FIG. 2 shows the single beam photometer in its basic configuration. An image 3 is formed by a light source 1 (incandescent lamp) by means of a lens 2 near an interference pattern filter 4. The beam has a diameter of from 1 to 3 mm at the interference pattern filter 4. The light made monochromatic by the interference pattern filter 4 then passes through a measurement cell 5 and is focused by a lens 6 onto a photoelectric converter 7. The electrical signal generated by the photoelectric converter is amplified in an electronic evaluation system 8 and analysed in respect of harmonic waves. The output signal which is proportional to the concentration of the substance under examination is recorded by a recording apparatus 9. A more detailed description of the electronic evaluation system 8 is given below with reference to FIG. 8. A chopper 10 for the periodic interruption of the beam path is arranged between the light source 1 and the lens 2. It consists in known manner of a rotating shutter. The mode of operation of the chopper 10 is also described in more detail below.

The basic unit of the single beam photometer is the interference pattern filter 4. It is held adjustably in a mounting 11 and is rotated by a motor 12 at a frequency of 30Hz about an axis A—A'. A suitable interference filter is for example marketed by Messrs Schott (Mainz) under the trade name VERIL IB 200. Such a filter has for example, a dimension in the direction of changing wavelength (X-direction in FIG. 3) of approximately 15cm, and at right angles thereto (Y- direction) a dimension of approximately 2.5cm. From this filter an area is separated, which is approximately 3cm long in the direction of changing wavelengths. Thus a rectangular filter is produced having the dimensions 3 × 2.5cm². The wavelength range contained therein includes wavelengths of from 1800 to 2000 nm; the half-width of filtering is approximately 100 nm. The point of intersection of the axis of rotation is marked in FIG. 3 by A. The beam striking the interference pattern filter produces a patch of light 13 with a diameter of a few mm at a distance $d$ from the axis of rotation. The arrow 14 indicates the direction of the increase in the wavelength of the interference pattern filter. In combination with the dispersion of the filter, the distance $d$ determines the wavelength range which the filter lets through during rotation. Therefore by changing $d$, the degree of modulation can be adjusted. In practice this takes place in such a way that the synchronous motor 12 mounted on a base plate together with the interference pattern filter 4 is displaced at right angles to the optical axis by means of a sliding guide. The mean transmitted wavelength, i.e. the central wavelength of the interference pattern filter 4 can be adapted to the measurement problem in question by adjusting the filter in the mounting 11. For this purpose the interference pattern filter 4 is displaced at right angles to the optical axis in the mounting 11 until the central wavelength agrees with the absorption point of the substance to be measured.

In the place of a rotational movement, the wavelength modulation can also be effected by an oscillation of the interference pattern filter 4 as shown in FIG. 2b. In this case the mounting 11 is coupled to an eccentric mechanism 12', which moves the interference pattern filter to and fro at right angles to the optical axis. Because of the inertia occurring, only relatively low frequencies are permissible (maximum 10Hz).

FIG. 4 shows the central wavelength transmitted by the interference pattern filter 4 as a function of time. The spectral range covered is the wavelength interval from 1.8 to 2.0 $\mu$m. This adjustment could, for example, be used when examining water, which has an absorption point at approximately 1.9 $\mu$m.

Figure 5:
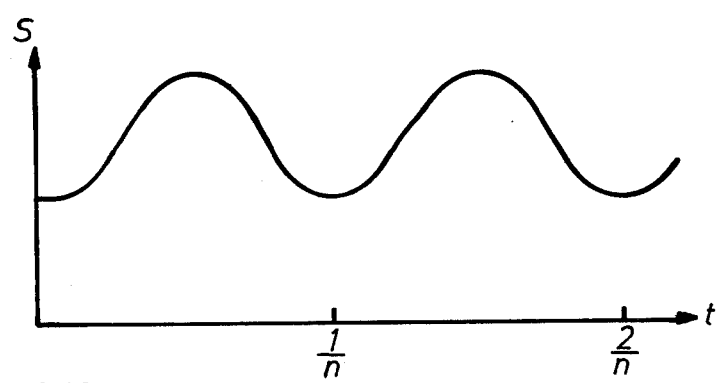
FIG. 5 shows the electrical signal at the photoelectric converter in the absence of the substance to be examined.

FIG. 5 shows the signal produced by the photoelectric converter 7, when there is no absorbing substance in the measurement cell 5. It is as a rule not constant, but periodic with the frequency of rotation $n$. This periodicity can be explained by a number of reasons. It is partially caused by the apparatus, e.g. by the spectral dependency of the light source emission and the receiver sensitivity, the dependency of the transmission of the filter on the wavelength etc. In addition the periodicity may arise from the fact that even without the presence of the substance to be determined, the other substances present, although they do not absorb selectively in the vicinity of the measurement wavelength, do display absorptions which change slowly with the wavelength. Mostly, the fluctuation illustrated in FIG. 5 is approximately sinusoidal. The harmonic waves are so small as to be negligible.

Figure 6:
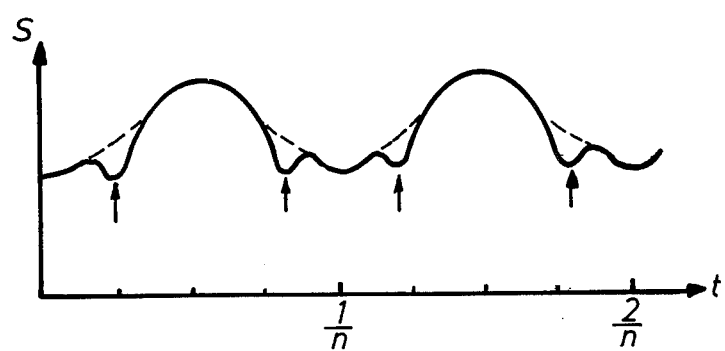
FIG. 6 shows the electrical signal at the photoelectric converter in the presence of the substance to be examined.

FIG. 6 shows the electrical signal produced by the photoelectric converter 7, in the presence of the substance to be determined. In addition to the modulation shown in FIG. 5, absorption peaks can be seen (marked with arrows), which can be attributed to the substance to be determined. In FIG. 6, for the sake of clarity, these peaks are greatly emphasised. If only a slight absorption occurs, the peaks may shrink to bulges which are hardly recognisable or not recognisable with the eye. It is of great significance for the measurement principle of the single beam photometer, that the absorption point of the substance to be determined lie as precisely as possible in the centre of the wavelength range covered. In this case the amplitude of the second harmonic is at a maximum.

Figure 7:
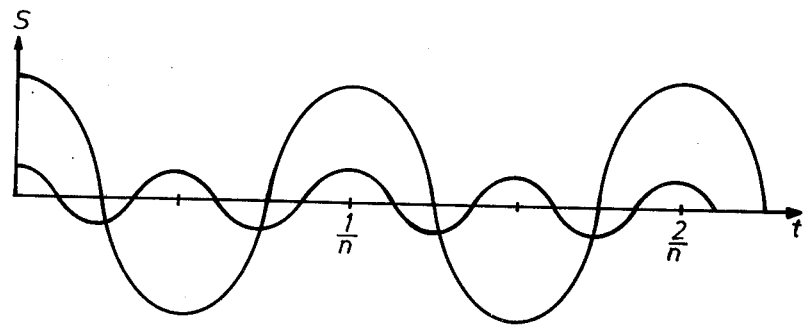
FIG. 7 shows the two first components of the Fourier analysis of the signal shown in FIG. 6.

FIG. 7 shows the first two elements of the Fourier analysis of the signal according to FIG. 6. The constant element is left out because in any case it falls away in the alternating voltage amplification provided.

Figure 8:
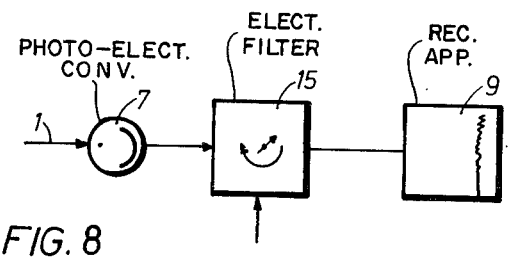
FIG. 8 shows the recording device with phase synchronous rectifiers connected up stream.

FIG. 8 shows schematically the electronic signal processing. The alternating voltage signal produced in the photoelectric converter 7 is fed, after amplification, to a tunable electronic filter 15 which is tuned to the first harmonic of the frequency i.e. to $2n$. The electronic filter 15 works with a phase synchronous rectifier, which is controlled by a synchronisation signal. The synchronisation signal can be taken from the rotating movement of the interference pattern filter 4, e.g. by vanes permanently connected with the interference pattern filter 4, passing through a light barrier. The electronic filter 15 is commercially available as a so-called lock-in-amplifier. The amplitude of the isolated harmonic $2n$ is recorded with the recording instrument 9. The recorded signal after the previous calibration of the method is a measurement for the concentration of the substance under examination.

Figure 9:
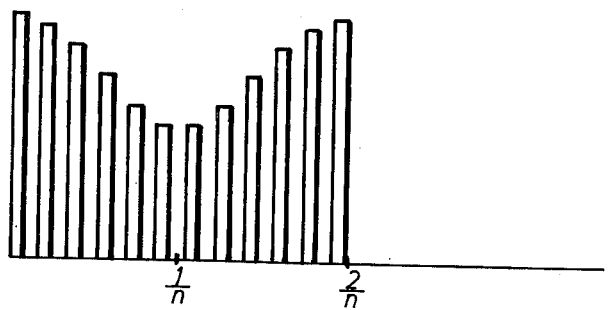
FIG. 9 shows the light signal reaching the converter with the additional use of a chopper.

In the photometer in its basic form as shown so far, there is effected a spectrally neutral attenuation of the beam, a change of the amplification factor etc., as a change in the steepness of the calibration curve of the method. A slight non-neutral attenuation of the beam in the spectral range in question, as occurs for example with the introduction of absorbent disruptive substances, in close proximity has no effect, since it only changes the amplitude of the basic frequency. An error only occurs in the concentration determination insofar as the additional absorption supplies a harmonic content in the measurement frequency, and essentially a zero-shift. The photometer could be used in this form, when changes of sensitivity in the measurement problem either do not occur or give rise to an error which is negligible in relation to errors from other sources. The latter frequently occurs in determining traces, when it is more a question of sensitivity of detection than of accuracy. The change of sensitivity with the neutral attenuation of the beam can be eliminated relatively easily. To achieve this an additional chopper 10 (see FIG. 2) is brought into the beam path. The chopper 10 consists as already mentioned, of a rotating shutter in the form of a sector and is driven at a frequency $m$ which is generally substantially higher than the measurement frequency. In practice a frequency is selected which lies above the measurement frequency by a factor of 10, thus in the example described here by 600 Hz. The signal occurring at the photoelectric converter 7 is then an amplitude modulated square wave alternating voltage, as shown in FIG. 9.

FIG. 10 shows the principle of the electrical signal processing using the chopper. The alternating voltage generated at the photoelectric converter 7 is amplified over a wide band in the pre-amplifier 16. Then measurement frequency $2n$ and comparative frequency $m$ are separated out by two separate filters 15 and 17. The electronic filter 15 works as described above with a phase-synchronous rectifier, controlled by the frequency $2n$. The two signals at the outputs of the filters are then rectified and fed to a divider circuit 18. It forms the ratio of measurement signal M to comparative signal V, which is recorded with the recording instrument 9. After previous calibration this ratio is a measurement for the concentration sought. In contrast to the above mentioned concentration measurement it is independent of a spectrally neutral attenuation of the light intensity.

Before measurement, the photometer must be adapted once to the absorption curve of the substance to be determined. For this purpose, first the width of the modulated spectral range is adjusted by altering the distance $d$ between the optical axis and the axis of rotation of the interference pattern filter 4. Then the interference pattern filter 4 is displaced in its mounting 11 at right angles to the optical axis, until the transmission wavelength (central wavelength) agrees with the absorption point of the substance under examination. At optimum adjustment a maximum measurement signal is obtained. However in the course of time, deviations between the adjusted central wavelength and the absorption point may occur through changes of the interference pattern filter 4, by the effects of temperature or by maladjustments. The photometer then no longer works at the optimum wavelength. Generally it is difficult to recognise such deviations. For this reason an auxiliary device is provided which facilitates a rapid sensitivity control. This device is shown schematically in FIG. 11a. FIG. 11a shows a view of the interference pattern filter 4 from a point in the plane of the optical axis and the rotation axis. In this view the rotation axis A—A' and the optical axis coincide. Here the interference pattern filter 4 is not at right angles to the optical axis or to the axis of rotation A—A', but is pivoted out of the vertical position by an angle w. The axis of pivoting 19 is at right angles on the optical axis and the axis of rotation A—A'. In pivoting through the angle w, the transmitted wavelength range is shifted by a certain amount towards shorter wavelengths. The auxiliary device now permits a reproducible pivoting of the filter including the mounting 11 and of the motor 12 about the axis 19. In this way the photometer can be rechecked during operation by slowly altering the angle w, to determine whether the device is still at its maximum sensitivity. A relatively small tilt is sufficient. An angle w of 10° is generally sufficient.

According to a refinement of the invention the tilt is periodically executed as shown in FIG. 11b. To this end, the angle w is changed by a mean value at a frequency 1 of from 1 to $10^{-2}$ Hz. For this purpose a lever is fitted rigidly connected to the axis of pivoting and is set in oscillating motion by a motor driven eccentric 20. The frequency of pivoting is therefore small relative to the frequency of rotation. The periodic pivoting leads to periodic alterations of the measurement value with the period of pivoting (see FIG. 12). The maximum amplitude in FIG. 12 is used as the measurement value. The maximum amplitude should not correspond to the greatest or smallest value of the angle w. Rather it should lie in the region of w/2. If this is not the case then the device must be checked.

In the embodiment described only the first harmonic is covered. It is evident that the electronic evaluation system can be so constructed that higher harmonics are taken into account or a mean value is formed covering all harmonic amplitudes.

What I claim is:

1. A single beam photometer for investigating a specimen, comprising:
   a. source means for projecting a beam of light in a predetermined path in the form of a closely limited cone;
   b. a graded interference filter having an optical axis and a range of wavelength transmission substantially coinciding with the absorption wavelength of the specimen to be investigated, means mounting the filter for positioning same in the path of said beam of light at the closely limited cone;
   c. moving means connected to the mounting means of said interference filter for periodically moving said filter relative to said beam of light at a basic frequency to modulate said beam of light;
   d. cell means for holding a specimen to be investigated disposed in the path of said modulated light beam;
   e. receiving means receptive of the beam of light passing through the specimen for converting said beam into information signals representative of a single harmonic of the basic frequency of movement of said filter; and
   f. means tuned to the single harmonic of the basic frequency for evaluating the information to obtain values of a desired characteristic of the specimen.

2. A single beam photometer as in claim 1, wherein the mounting means disposes the optical axis of said intereference filter displaced from the light beam, and said moving means comprises means for rotating said intereference filter.

3. A single beam photometer as in claim 2, wherein the mounting means comprises adjusting means for selectively displacing said interference filter in the vertical direction to adjust the spacing between the optical axis and said beam of light to a preselected distance.

4. A single beam photometer as in claim 1, wherein the moving means comprises shift means for shifting said interference filter in the direction of changing wavelength relative to said beam of light.

5. A single beam photometer as in claim 1, in which said moving means comprises oscillating means for periodically shifting said interference filter back and forth in the direction of changing wavelength.

6. A single beam photometer as in claim 1, wherein said moving further comprises tilt means for selectively tilting said interference filter through a preselected angle about an axis perpendicular to the optical axis of said filter.

7. A single beam photometer as in claim 6, in which said tilt means comprises means for periodically tilting said interference filter at a selected frequency.

8. A single beam photometer as in claim 7, in which the selected frequency of said tilt means is substantially less than the basic frequency of said moving means.

9. A single beam photometer as in claim 1, in which the evaluating means comprises a filter tunable to harmonics of said basic frequency.

10. A single beam photometer as in claim 9, in which said evaluating means further includes an amplifier lockable to the harmonics of the basic frequency of said interference filter.

11. A single beam photometer as in claim 1, and further comprising chopping means disposed between said light source and said interference filter for chopping said light beam.

* * * * *

UNITED STATES PATENT OFFICE
CERTIFICATE OF CORRECTION

PATENT NO. : 4,090,792
DATED : May 23, 1978
INVENTOR(S) : Konrad Bunge

It is certified that error appears in the above-identified patent and that said Letters Patent are hereby corrected as shown below:

Column 4, line 9, change "11" to -- 11a --;

lines 11 and 12, between these lines add --Figure 11b shows the embodiment of Fig. 11a with the filter mounting mounted for tilting.-- ;

line 19, change "2" to -- 2a --.

Signed and Sealed this

Twenty-seventh Day of February 1979

[SEAL]

Attest:

RUTH C. MASON
Attesting Officer

DONALD W. BANNER
Commissioner of Patents and Trademarks